US008754942B2

(12) United States Patent
Hanses et al.

(10) Patent No.: US 8,754,942 B2

(45) Date of Patent: Jun. 17, 2014

(54) DETECTION DEVICE AND METHOD FOR DETECTING FIRES AND/OR SIGNS OF FIRE

(75) Inventors: Thomas Hanses, Feldkirchen-Westerham (DE); Ralph Bergmann, Neubeuern (DE)

(73) Assignee: Robert Bosch GmbH, Stuttgart (DE)

( * ) Notice: Subject to any disclaimer, the term of this patent is extended or adjusted under 35 U.S.C. 154(b) by 566 days.

(21) Appl. No.: 12/988,350

(22) PCT Filed: Nov. 21, 2008

(86) PCT No.: PCT/EP2008/065995

§ 371 (c)(1), (2), (4) Date: Nov. 12, 2010

(87) PCT Pub. No.: WO2009/129870

PCT Pub. Date: Oct. 29, 2009

(65) Prior Publication Data

US 2011/0050902 A1 Mar. 3, 2011

(30) Foreign Application Priority Data

Apr. 25, 2008 (DE) ........................ 10 2008 001 383

(51) Int. Cl.

*H04N 7/18* (2006.01)

*H04N 9/47* (2006.01)

(52) U.S. Cl.

USPC ............................................ 348/143; 348/82

(58) Field of Classification Search

CPC ......... H04N 7/181; H04N 7/183; H04N 7/18; H04N 7/188; G08B 13/19656

USPC .................................................... 348/143, 82

See application file for complete search history.

(56) References Cited

U.S. PATENT DOCUMENTS

| | | | |
|---|---|---|---|
| 5,790,181 | A | 8/1998 | Chahl et al. |
| 7,286,704 | B2 | 10/2007 | Pfefferseder et al. |
| 2005/0007479 | A1 | 1/2005 | Ahiska |
| 2005/0083405 | A1 | 4/2005 | Imoto et al. |

(Continued)

FOREIGN PATENT DOCUMENTS

| | | |
|---|---|---|
| CN | 1637578 | 7/2005 |
| DE | 100 11 411 | 12/2001 |

(Continued)

*Primary Examiner* — Dave Czekaj

*Assistant Examiner* — Tsion B Owens

(74) *Attorney, Agent, or Firm* — Michael J. Striker

(57) ABSTRACT

Fire detector installations comprise fire detectors as sensor devices for detecting fires, smoke, flames or other signs of fire, and are used in both public buildings, such as schools or museums, and in private buildings. The invention relates to a detection device (1) for detecting fires and/or signs of fire in an area to be monitored, said detection device comprising an image-producing sensor element (2) for emitting image data, and an optical element (3) mounted upstream of the sensor element (2), which together form a camera system (6) for monitoring the area to be monitored. The detection device also comprises an evaluation element (8) designed to detect fires or signs of fire in the area to be monitored by evaluating the image data. The optical element (3) is arranged and/or embodied in such a way that the field of vision (4) of the camera system has a maximum viewing angle alpha of at least 120°, preferably at least 150°, and especially at least 180°, in at least one plane which is coplanar to the direction of observation (5) of the camera system (6).

16 Claims, 2 Drawing Sheets

(56) References Cited

U.S. PATENT DOCUMENTS

| | | | | |
|---|---|---|---|---|
| 2006/0202847 | A1 | 9/2006 | Oppelt et al. | |
| 2006/0203090 | A1* | 9/2006 | Wang et al. | 348/143 |
| 2006/0284971 | A1 | 12/2006 | Wren et al. | |
| 2007/0070190 | A1 | 3/2007 | Yin et al. | |
| 2008/0117064 | A1* | 5/2008 | Shin | 340/577 |
| 2010/0002071 | A1* | 1/2010 | Ahiska | 348/36 |

FOREIGN PATENT DOCUMENTS

| | | |
|---|---|---|
| DE | 102 46 056 | 4/2004 |
| EP | 0 591 585 | 4/1994 |
| EP | 1 381 005 | 1/2004 |
| WO | 2006/008146 | 1/2006 |

* cited by examiner

DETECTION DEVICE AND METHOD FOR DETECTING FIRES AND/OR SIGNS OF FIRE

BACKGROUND INFORMATION

The invention relates to a detection device for detecting fires and/or signs of fire in a surveillance region using an imaging sensor element designed to output image data, the detection device comprising an optical device installed upstream of the sensor element, wherein the sensor element and the optical device in combination form a camera device for monitoring the surveillance region, and comprising an evaluation device designed to detect the fires and/or signs of fire in the surveillance region by evaluating the image data. The invention furthermore relates to a method for detecting fires and/or signs of fire.

Fire alarm systems include fire alarms as sensor devices for detecting fire, smoke, flames, or other signs of fire; they are used in public buildings such as schools or museums, and in private buildings. The majority of fire alarms may be divided roughly into two groups: a first group relates to point-type fire alarms which are used e.g. in offices or children's rooms, that is, in small spaces. Point-type fire alarms are typically installed on the ceiling, and they detect a fire or spreading smoke via optical, thermal, or chemical detection at exactly one point. These fire alarms have the advantage that the rising smoke that collects below the ceiling is detected very quickly. The disadvantage of these fire alarms is that a plurality of fire alarms must be used in larger spaces, e.g. warehouses, to ensure that the entire area is covered.

An alternative to this approach is provided by a second group of fire alarms that are designed as video fire-detection devices, in the case of which video surveillance systems are used that record a video image of a surveillance region using commercially available surveillance cameras and evaluate it in a surveillance center for the presence of fire or signs of fire.

Publication DE 10 246 056 A1 discloses a smoke alarm that includes an image recorder and a light source. This smoke alarm is used e.g. as a ceiling-mounted smoke alarm, and is designed such that the focal point of the image recorder is adjusted to be situated approximately 10 cm below the housing of the smoke alarm. If the illumination is poor, a light source can be activated in order to illuminate the focal point. In the case of smoke alarms of this type, since the focal point is nearby, background images are blurry as compared to images taken of the surroundings directly adjacent to the focal point.

Publication DE 100 114 11 A1, which represents the closest prior art, likewise relates to a fire alarm that uses a video camera or an infrared camera as the image recorder, the image recorder being adjusted such that a large camera viewing field and a life-like depiction of the observed scene are obtained. Fire is detected using object analysis, in which individual objects in the scene are analyzed automatically, in particular in terms of whether these objects are concealed by smoke, thermal inhomogeneities, or fire, the analysis being carried out by comparing the objects currently being recorded to stored objects.

DISCLOSURE OF THE INVENTION

Within the scope of the invention, a detection device is provided that has the features of claim 1, and a method having the features of claim 13 is provided for detecting fires and/or signs of fire. Preferred or advantageous embodiments of the invention result from the dependent claims, the description that follows, and the attached figures.

The detection device according to the invention is suited and/or designed to detect fires and/or fire features, in particular signs of fire, in a surveillance region, and may also be referred to as a fire alarm or a fire sensor. As an option, the detection device may be a component of a fire alarm system. Preferably, fires and/or signs of fire are detected based on primary features such as optical emissions, in particular flames or heat, in a visible range and/or a near infrared range, in particular at wavelengths of up to 900 nanometers. According to modified embodiments, the detection device is sensitive to optical emissions in the near infrared range, that is, between 900 nanometers and 3000 nanometers, and/or in the near infrared range greater than 3000 nanometers. As an alternative or in addition to the primary signs of fire, the detection device can also optionally register secondary signs of fire such as thick smoke or fumes, optical distortions due to strong heat, thermal inhomogeneities, or the like.

An imaging sensor element is a component of the detection device, the imaging sensor element being designed to output image data e.g. two-dimensional matrix fields containing pixel information. The sensor element can be designed e.g. as a CMOS-, CCD-, UV-, VIS-, NIR-, IR- and/or FIR-image sensor. It may also be designed as a two-dimensional sensor field e.g. as a thermopile array.

To implement optical imaging of the surrounding region or sections thereof, the detection device includes an optical device which is installed upstream of the sensor element. The sensor element and the optical device in combination therefore form a camera device which is suitable and/or disposed and/or designed for monitoring the surveillance region.

The camera device is connected in a signal-transmitting manner to an evaluation device, wherein the evaluation device can be positioned locally, in combination with the camera device or at a distance therefrom, e.g. in a surveillance center. The evaluation device is designed to detect fires or signs of fire in the surveillance region by evaluating image data. The detection is preferably carried out using digital image-processing algorithms; in modified embodiments, image-processing steps can also be implemented, as an alternative or in addition thereto.

Within the scope of the invention it is provided that the viewing field of the camera device, which can be conical in shape from the camera direction outward, has a maximum viewing angle of at least 120°, preferably at least 150°, and in particular at least 180°, in at least one plane that is coplanar to the direction of observation of the camera device, that is, in a plane containing the observance vector of the camera device.

Due to this development, an optical device is defined that provides the camera device with a very wide viewing field, with the advantage that fire can be detected using a point-type fire alarm while a wide range continues to be reliably observed. Due to this development, the previous limitation of image-sensor supported fire alarms, which relates to the size of the surveillance region, is overcome.

In a preferred development of the invention, the maximum viewing angle of at least 120°, preferably at least 150°, and in particular at least 180° is defined for every plane that is coplanar to the direction of observation of the camera device. It is possible for the same maximum viewing angle to apply in every plane, or for the maximum viewing angle to vary as a function of the angle of rotation about the direction of observation of the camera device, but to be located in the specified ranges. According to a further embodiment, the maximum viewing angle across all planes is in the specified ranges on average. According to one possible embodiment of the invention, the viewing field is axially symmetrical or at least approximately axially symmetrical to the direction of observation of the camera device. The center line of the cone formed by the viewing field is the vector of the direction of observation of the camera device. This embodiment makes it possible to install the camera device easily in the surveillance region.

According to one possible supplement to the invention, a central and/or middle region of the viewing field, and/or any other region of the viewing field is hidden or can be hidden optically and/or via programming. This supplement to the invention accounts for the fact that normal motions, which could prevent the detection of fires and/or signs of fire, are to be expected in certain regions of the viewing field. By concealing the central and/or middle region of the viewing field, these interfering factors are eliminated and the evaluation performed by the evaluation device is simplified.

According to a preferred embodiment, a blind field is hidden in the conical viewing field of the camera device; the blind field is disposed e.g. in the center and/or the middle, and is preferably likewise conical, having a viewing angle of at least 30°, preferably at least 60°, and in particular at least 90°. The detection device therefore has a resultant viewing field which extends from 30° or 60° or 90° up to 120° or 150° or 180°. This embodiment is particularly advantageous when—as explained in detail below—the detection device should be installed and/or is installed on a ceiling, wherein the floor region is deactivated by the hidden region, and the resultant viewing field is limited to the regions close to the ceiling, where smoke or heat typically collects when a fire occurs. As a possible further advantage, interfering motions in the region close to the floor are hidden.

According to a preferred embodiment of the invention, the range of the depth of field of the camera device begins at a distance of at least 1 m, and preferably at least 1.5 m. Particularly preferably, the depth of field extends up to a range of at least 5 m, preferably at least 10 m, and in particular at least 15 m. This embodiment has the advantage that signs of fire, in particular smoke, can be detected directly at the detection device, but also at some distance from the detection device, and therefore a fire is reliably detected even if the source of the fire is far from the camera device. The range of the depth of field can be adjusted e.g. by using a correctly positioned aperture in the camera device.

According to a preferred embodiment, the evaluation is performed by analyzing abstract image features, such as texture features, color values, intensities, or other image information in the image data. Due to the preferred, large range of the depth of field, it is ensured that a sufficient number or quantity of image information of this type is acquired, thereby ensuring that the evaluation is reliable. In particular, the embodiment according to the invention prevents the detection of only a wall, a table, or a uniform floor, the image of which does not contain enough information to detect a fire. Preferably, the field of view of the camera device also makes it possible to detect the corners of a room and all objects disposed therein.

Particularly preferably, the camera device includes an autofocus and/or a focus that can be adjusted using a motor. Basically, it is also possible—when a focus is available that can be adjusted using a motor—for the camera device to scan between a close field and a far field, thereby making it possible to also monitor smoke developments close to the camera device e.g. in a region that is less than 1 m, and in particular less than 10 cm away. In this embodiment, the detection device performs two functions in that it utilizes the properties and advantages of a point-type fire alarm, and those of a fire alarm that performs detection across a wide area.

According to a preferred structural implementation, the optical device is designed as a fisheye, a prism, a lens or lens system, a reflective system, and/or a diffractive system e.g. composed of glass or plastic. For example, an “omni-view” camera having a circumferential field of view of 360° can be used.

To simplify the evaluation process, it is preferable for image data that may be distorted by the optics device to be evaluated by the evaluation device without distortion correction, that is, in a distorted state. Basically, the step of correcting distortion need be carried out only when an image is required that can be recognized by the human eye or by human perception. According to this preferred embodiment, only the abstract image information such as texture, intensity, color, etc. is required for detection, and so distortion correction would represent an unnecessary increase in the amount of work required.

According to a possible development of the invention, the detection device performs a further function, wherein the evaluation device is designed to also detect and/or evaluate object motions in the surveillance region e.g. in the sense of a break-in alarm or an alarm system. The evaluation of object motions in the surveillance region can be based on the same image data as fire detection, thereby eliminating the need for additional hardware, and it is only necessary for the evaluation device to run an additional image-processing algorithm.

According to a particularly preferred embodiment of the invention, the detection device is designed as a ceiling system that is installed on a ceiling, wherein the direction of observation of the camera device is oriented preferably perpendicularly or substantially perpendicularly to the ceiling and/or the floor. The detection device includes e.g. fastening means or a housing that is designed for ceiling installation.

According to a further preferred embodiment, the viewing field of the camera device is annular, the annular shape encircling the direction of observation, thereby enabling a region close to the ceiling to be detected by the camera device around 360° in the circumferential direction.

Optionally, the detection device is designed as a multicriteria alarm, wherein one or more further sensor devices for detecting fire are integrated in addition to the camera device. The sensor device can be designed e.g. as an optical sensor, in particular based on the principle of scattered light, a thermal sensor, in particular a temperature sensor, and/or a chemical sensor, in particular a carbon monoxide or carbon dioxide sensor.

According to further embodiments of the invention it is possible for the detection device to include, as the evaluation device, an embedded system which is embedded, in particular, in a common housing with the camera device, and/or which is connected and/or connectable via a field bus, in particular a two-wire field bus, a two-wire line, or a four-wire line, for purposes of data transmission and power supply.

In order to further reduce the power demand of the multicriteria sensor, it is provided that the camera device and/or the evaluation device and/or the detection device can switch automatically between an energy-saving quiescent state and a surveillance state. It appears sufficient e.g. for the camera device to operate using a low refresh rate of less than 15 hertz. The evaluation device is activated e.g. only at the relevant measuring times; the image data are evaluated and possibly stored, and the evaluation device is then deactivated once more e.g. by being switched to the sleep mode.

A further subject matter of the invention relates to a method for detecting fires and/or signs of fire in a surveillance region, wherein a detection device, preferably according to one of the preceding claims or as described above, records a section of the surveillance region that is close to the ceiling and surrounds the detection device, in particular in an annular shape, and to an evaluation device that detects fires and/or signs of fire by evaluating the image data of the section that was recorded.

BRIEF DESCRIPTION OF THE DRAWINGS

Further features, advantages, and effects of the invention result from the following description of preferred embodiments of the invention. The drawings show.

Parts or quantities that are identical or similar are labeled with the same reference characters or similar reference characters.

EMBODIMENT(S) OF THE INVENTION

Figure 1:
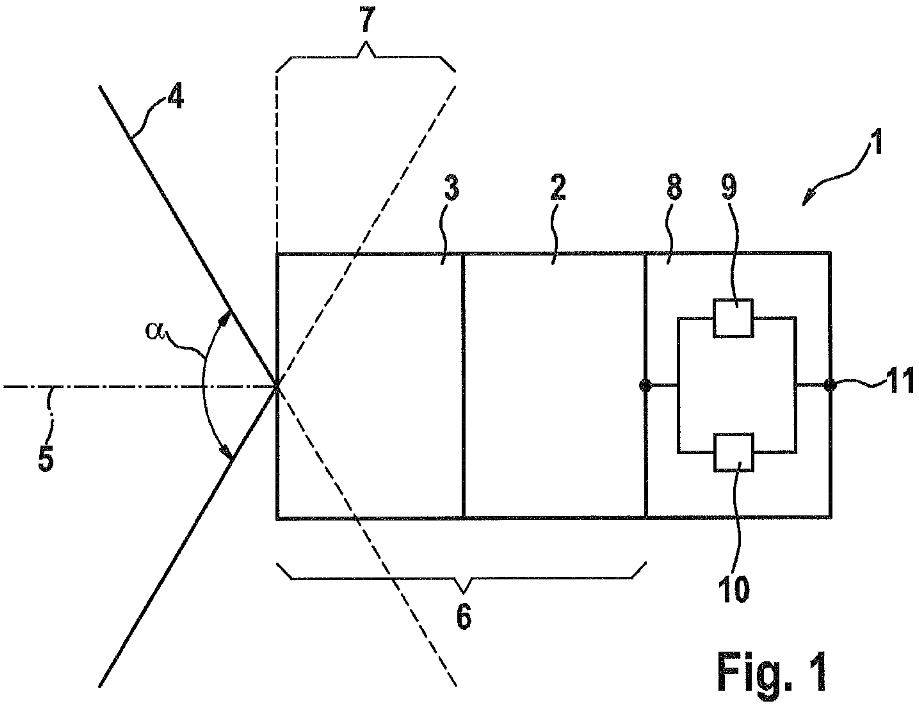
FIG. 1 a block diagram of a detection device, as a first embodiment of the invention.

FIG. 1 shows a highly schematicized depiction of a detection device 1, as an embodiment of the invention. Detection device 1 includes a sensor element 2, which is designed e.g. as a CCD chip, CMOS chip, UV-, VIS-, NIR-, FIR-camera or the like, and makes it possible to record an image in a spatially resolved manner and convert it to image data.

An optical device 3 is installed upstream of sensor element 2; as a beam-shaping system, sensor element 2 makes it possible to image a section of a surveillance region on sensor element 2. Optical device 3 can be designed e.g. as a fisheye, a specially ground lens, a prism, a diffractive element or optical system, or a reflective optical system e.g. in the form of a metallized torus. As explained below with reference to FIGS. 2 and 3, the optical device makes it possible for the sensor element to cover a viewing field 4 that extends approximately axially symmetrically about a direction of observation 5 in the shape of a cone or truncated cone, or, in other embodiments, hemispherically or more than hemispherically.

The aperture angle of viewing field 4 of camera device 6 formed by optical device 3 and sensor element 2 is described by a maximum viewing angle alpha which is measured in a plane that is coplanar to the vector of direction of observation 5, and therefore the vector of direction of observation 5 lies in this plane. The maximum viewing angle alpha is at least 120°, preferably at least 150°, and in particular at least 180°. Given a maximum viewing angle alpha of greater than 180°, a region 7 that extends around detection device 1 is likewise detected by camera device 6.

The image data recorded by sensor element 2 are forwarded e.g. as video data to an evaluation device 8 which is equipped with a fire detection module 9 for detecting fires and/or signs of fire on the basis of the image data. In the evaluation, only abstract image information such as texture, intensity, and color is evaluated, while object detection or segmentation is preferably not performed. Optionally, the evaluation device also includes a motion-detection module 10 which detects object motions in viewing field 4 on the basis of the same image data, and triggers a signal based on specifiable rules.

Evaluation device 8 includes a signal output 11, via which a signal, in particular a fire alarm signal or a break-in signal, can be output. Evaluation device 8 can be an integral component of detection device 1 e.g. in a common housing; as an alternative, the image data are forwarded via a wired or wireless connection to an evaluation center in which evaluation device 8 is disposed.

To adjust the depth of field, optical device 3 can optionally include an autofocus and/or a static or variable aperture which can be adjusted manually or automatically. The depth of field range extends e.g. from a range of greater than 1 m to infinity.

Figure 2:
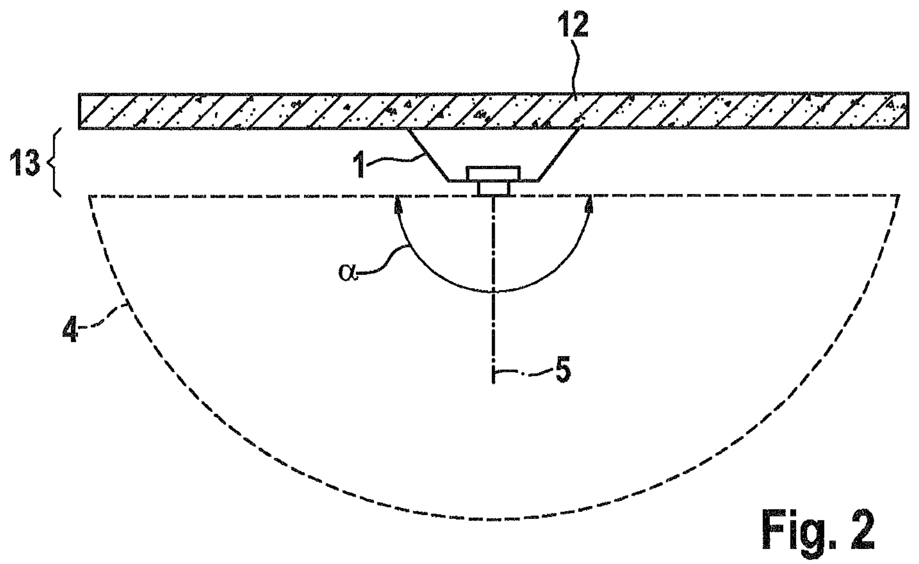
FIG. 2 a schematic depiction of the assembly and viewing field of the detection device shown in FIG. 1, in a first possible embodiment.

FIG. 2 shows a highly schematicized depiction of detection device, in an installed state on a ceiling 12 of a room. Optionally, detection device 1 can also be installed in a recessed manner. Detection device 1 is designed as a point-type alarm which has a viewing field having a maximum viewing angle of 180° in the embodiment shown in FIG. 2. In the circumferential direction about the camera, that is, perpendicular to the plane of the paper, the viewing field is 360°. In this embodiment of the viewing field, detection device 1, also as a point-type alarm, can monitor an entire large room, and in particular perform detection in the corner regions of the room. Viewing angle alpha can also be designed to be greater than 180°, thereby enabling region 7 close to the ceiling to be detected at least in sections.

Due to large viewing angle alpha of object device 2, the image becomes distorted. These distortions are preferably not compensated for, nor is the distortion corrected, since evaluation device 8 is designed to process distorted image data. To detect signs of fire and/or object motions, it is sufficient in particular for the surveillance region to be depicted with sufficiently sharp definition. Object detection is not absolutely necessary. It is only necessary to evaluate abstract image information such as texture, intensity, color, etc. for a space having a large volume.

As shown in the illustration, direction of observation 5 of detection device 1 is directed perpendicularly to the floor, thereby enabling regions 13 close to the ceiling to be monitored in the edge region of viewing field 4 in particular, in which smoke or similar emissions from a fire typically collect.

Figure 3:
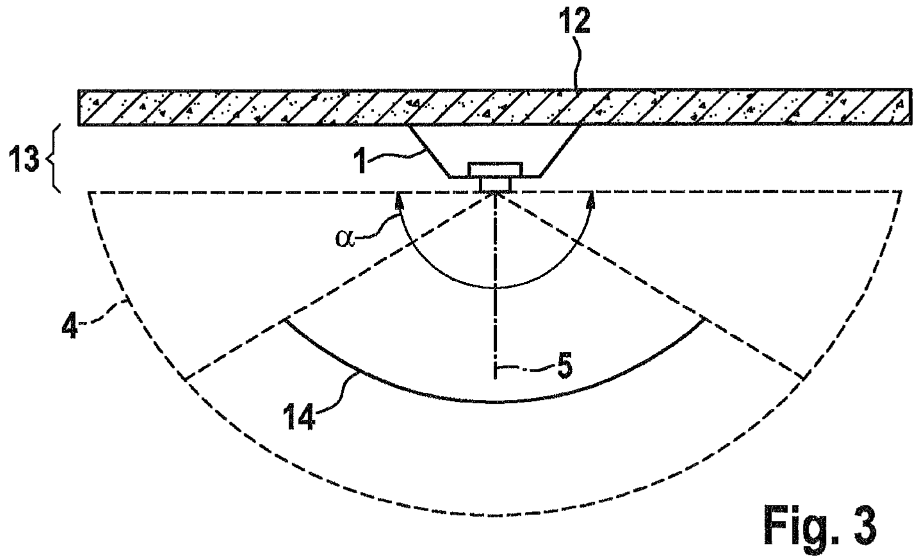
FIG. 3 a schematic depiction of the assembly and viewing field of the detection device shown in FIG. 1, in a second possible embodiment.

FIG. 3 shows a modified embodiment of detection device 1 depicted in FIG. 1, wherein a middle or central blind region 14 is covered or hidden in viewing field 4 in a mechanical manner or via programming, thereby eliminating it as a monitored region. Covering or hiding blind region 14 ensures that only image data from regions 13 close to the ceiling are evaluated. This has the advantage that any disturbances (e.g. motions in the floor region) are not observed, and the detection range focuses only on the region in which smoke or other signs of fire are expected to collect.

What is claimed is:

1. A detection device (1) for detecting fires and/or signs of fire in a surveillance region comprising: a camera device 6 for monitoring the surveillance region that includes one imaging sensor element (2) designed to output image data and an optical device (3) installed upstream of the sensor element (2), an evaluation device (8) designed to detect fires or signs of fire in the surveillance region by evaluating the image data, wherein the optical device (3) is disposed and/or designed such that the viewing field (4) of the camera device has a maximum viewing angle (α) of at least 120° in at least one plane that is coplanar to the direction of observation (5) of the camera device (6); wherein a central and/or middle region (14) of the viewing field is hidden optically and/or via programming, and has a viewing angle of at least 30°; and wherein the range of the depth of field of the camera device (6) starts at a distance of at least 1 m; and wherein the central and/or middle region (14) of the viewing field is concealed to eliminate interfering factors therefrom during processing by the evaluation device (8).

2. The detection device (1) according to claim 1, characterized in that the viewing field (4) has a maximum viewing angle ($\alpha$) of at least 120° in all planes that are coplanar to the direction of observation (5) of the camera device (6).

3. The detection device (1) according to claim 1, characterized in that the viewing field (4) is disposed with axial symmetry about the direction of observation (5) of the camera device (6).

4. The detection device (1) according to claim 1, characterized in that the camera device (6) includes an autofocus and/or a focus that can be adjusted using a motor.

5. The detection device (1) according to claim 1, characterized in that the optical device (3) is designed as a fisheye, a prism, a lens or lens system, a reflective system, and/or a diffractive system.

6. The detection device (1) according to claim 1, characterized in that the image data that are distorted by the optics device (3) are evaluated by the evaluation device (8) without distortion correction.

7. The detection device (1) according to claim 1, characterized in that the evaluation device (8) is designed to detect and/or evaluate object movements in the surveillance region.

8. The detection device (1) according to claim 1, characterized as a ceiling system, wherein the direction of observation (5) of the camera device is oriented perpendicularly and/or substantially toward the ceiling and/or the floor.

9. The detection device (1) according to claim 8, characterized in that the detection device (1) can be installed and/or is installed such that it is recessed in the ceiling.

10. A method for detecting fires and/or signs of fire in a surveillance region, characterized in that a detection device (1) according to claim 1, records a region (13) of the surveillance region that is close to the ceiling and surrounds the detection device (1), and an evaluation device detects fires and/or signs of fire by evaluating the image data from the recorded region.

11. The detection device (1) according to claim 1, wherein the viewing field (4) of the camera device has a maximum viewing angle (alpha) of at least 150° in the at least one plane that is coplanar to the direction of observation (5) of the camera device (6).

12. The detection device (1) according to claim 1, wherein the viewing field (4) of the camera device has a maximum viewing angle (alpha) of at least 180° in the at least one plane that is coplanar to the direction of observation (5) of the camera device (6).

13. The detection device (1) as recited in claim 1, wherein the hidden region (14) has a viewing angle of at least 60°.

14. The detection device (1) as recited in claim 12, wherein the hidden region (14) has a viewing angle of at least 90°.

15. The detection device (1) according to claim 1, wherein the range of the depth of field of the camera device (6) starts at a distance of 1.5 m.

16. A detection device (1) for detecting fires and/or signs of fire in a surveillance region comprising: a camera device (6) for monitoring the surveillance region that includes one imaging sensor element (2) designed to output image data and an optical device (3) installed upstream of the sensor element (2), an evaluation device (8) designed to detect fires or signs of fire in the surveillance region by evaluating the image data, wherein the optical device (3) is disposed and/or designed such that the viewing field (4) of the camera device has a maximum viewing angle ($\alpha$) of at least 120° in at least one plane that is coplanar to the direction of observation (5) of the camera device (6), and wherein the detection device (1) can be installed and/or is installed such that it is recessed in the ceiling; and wherein a central and/or middle region (14) of the viewing field (4) has a viewing angle of at least 30° and is hidden optically and/or via programming to conceal and to eliminate interfering factors therefrom during processing by the evaluation device (8).

* * * * *